(12) United States Patent
Deshpande et al.

(10) Patent No.: US 6,799,233 B1
(45) Date of Patent: Sep. 28, 2004

(54) GENERALIZED I²C SLAVE TRANSMITTER/ RECEIVER STATE MACHINE

(75) Inventors: Amrita Deshpande, Albuquerque, NM (US); Paul Andrews, Sandia Park, NM (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 558 days.

(21) Appl. No.: 09/895,921

(22) Filed: Jun. 29, 2001

(51) Int. Cl.⁷ .............................................. G06F 13/00
(52) U.S. Cl. ..................... 710/110; 710/107; 710/58; 710/61
(58) Field of Search ................................ 710/104–107, 710/110, 112, 306, 309, 311, 313, 314, 58, 61, 33–35

(56) References Cited

U.S. PATENT DOCUMENTS

| | | | |
|---|---|---|---|
| 4,815,026 A | * | 3/1989 | Barbu et al. ................ 710/107 |
| 5,696,994 A | * | 12/1997 | Pang ............................ 710/72 |
| 5,878,234 A | * | 3/1999 | Dutkiewicz et al. ........ 710/109 |
| 6,122,690 A | * | 9/2000 | Nannetti et al. ............ 710/302 |
| 6,286,073 B1 | * | 9/2001 | Vegter ......................... 710/306 |
| 6,430,636 B1 | * | 8/2002 | Cranston et al. ............ 710/107 |
| 6,510,484 B1 | * | 1/2003 | Kim et al. ................... 710/314 |
| 6,530,029 B1 | * | 3/2003 | Metchev ..................... 713/500 |
| 6,553,441 B1 | * | 4/2003 | Wang et al. ................. 710/64 |
| 6,591,322 B1 | * | 7/2003 | Ervin et al. ................. 710/110 |
| 6,622,188 B1 | * | 9/2003 | Goodwin et al. ........... 710/301 |
| 6,684,362 B1 | * | 1/2004 | Currier et al. .............. 714/758 |
| 2002/0108011 A1 | * | 8/2002 | Tanha ......................... 710/306 |

OTHER PUBLICATIONS

Deshpande, Amrita, Design of a Behavioral (Register Transfer Level, RTL) Model of the Inter–Integrated Circuit or I2C–Bus Master–Slave Interface, 1999, University of New Mexico.
The I2C Bus Specification, Philips Semiconductors, pp 2–16.

* cited by examiner

*Primary Examiner*—Paul R. Myers
*Assistant Examiner*—Raymond N Phan

(57) ABSTRACT

A robust state machine is provided for controlling a slave interface to an I²C-bus. The state machine is configured to enforce the slave-device-protocol of the I²C specification, and to provide recovery from anomalous master-device behavior. In accordance with this invention, the state transitions of the state machine at the slave-device are controlled by the master-device's control of the SCL line of the I²C-bus, except if a START condition is detected. The state machine is configured to asynchronously respond to a START condition on the I²C-bus, regardless of its current state, to force the state machine to a known state. In the known state following the START condition, the slave-device terminates any transmissions to the I²C-bus, thereby minimizing subsequent interference on the bus.

19 Claims, 2 Drawing Sheets

GENERALIZED I²C SLAVE TRANSMITTER/RECEIVER STATE MACHINE

BACKGROUND OF THE INVENTION

1. Field of the Invention

This invention relates to the field of data communication systems, and in particular to a device and method for facilitating communications via an I²C bus.

2. Description of Related Art

The Inter Integrated Circuit (I²C) bus developed by Philips Corporation allows integrated circuits to communicate directly with each other via a simple bi-directional 2-wire (plus ground) bus. A device connects to each of the two wires on the bus, one (SDA) for the communication of data, and the other (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I²C bus is identifiable by a unique address, and can operate as either a transmitter or a receiver, or both. Data transfers are effected using a master-slave protocol. A master is a device that initiates a data transfer and generates the clock signals to permit the transfer; any device that is addressed is considered a slave for this transfer. The data transfer can be initiated by a master to either transmit data to the slave (write), or to request data from the slave (read). A particular device can be capable of operating as either a master, a slave, or both. For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state ("high"). A master initiates a data transfer by asserting a transition to a logic-low state ("low") on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high. Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I²C data transfer is illustrated in FIG. 1, which illustrates the signals on an SDA line and an SCL line forming the I²C bus. A START condition (S) is illustrated at 110, corresponding to high-to-low transition of the signal on the SDA line while the SCL line is high. After the START, the host transmits an address 120, nominally seven bits, followed by a read/write-not indicator 130. After transmitting the address 120 and the direction of data transfer (R/W-) 130, the host releases the SDA line, allowing it to rise to a logic-high level. If a slave device recognizes its address, the slave device transmits an acknowledge signal (ACK) 140 by pulling the bus low. The absence of a low signal when the host releases the SDA line, therefore, indicates a non-acknowledgement (NAK). If the address 120 is acknowledged, via a low at 140, the transmitting device transmits the data 150. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data 150 by asserting a logic-low value on the SDA line, at 160. If the data is acknowledged, the transmitter sends additional data 170. This process continues until the entirety of the data is communicated, or until a transmitted data item is not-acknowledged, as indicated at 180. The master can subsequently reassert a START signal (not illustrated), and repeat the process above, or, can assert a STOP signal (P) 190 to terminate this data-transfer session.

The above interface protocol can be implemented in a variety of ways. To minimize the development time for programming or designing an I²C interface, a variety of general-purpose interface schemes have been published. "DESIGN OF A BEHAVIORAL (REGISTER TRANSFER LEVEL, RTL) MODEL OF THE INTER-INTEGRATED CIRCUIT OR I²C-BUS MASTER-SLAVE INTERFACE", Master's Thesis of Amrita Deshpande, University of New Mexico, 1999, discloses an I²C master interface and slave interface that is intended to be embodied in an I²C device, and is incorporated by reference herein. By providing a verified I²C interface, system designers need not address the details of the I²C specification and protocol. Both the master and the slave interfaces of this thesis are state-machine based.

A state-diagram 200 corresponding to the I²C slave protocol of the referenced thesis is illustrated in FIG. 2. The state diagram 200 comprises six states, A–F, and state transitions are effected on the active edge (0-to-1 transition) of the SCL clock signal from the master. That is, in accordance with the I²C specification, the master controls the sequence and synchronization of operations on the bus by controlling the SCL clock line. A slave device must operate in synchronization with the master device, such that transitions on the SDA line only occur while the SCL line is low, and such that valid data is present on the SDA line for the duration of the high state on the SCL line.

A reset signal, typically a power-on reset, brings the interface to state A, the idle state. When a START condition is detected, the interface enters state B, where it receives the aforementioned (FIG. 1) address 120 and data-direction 130 information from the host. If the received slave address does not match the address associated with the particular interface 200, the interface returns to the idle state A. If the data-direction 130 is read, the interface enters state C; otherwise, if the data-direction 130 is write, the interface enters state E.

When the interface enters state C or state E, it acknowledges the receipt of its address and the data-direction, and prepares the interface for the required read or write operation. As noted above, the read and write directions are relative to the master device. Therefore, at the slave device, a read corresponds to a request for the slave to transmit data to the master for reading, and a write corresponds to a request for the slave to receive data written from the master.

In state C, the data that is to be transmitted to the master is loaded, and the interface transitions to state D, wherein it transmits the loaded data to the master. If the master acknowledges the receipt of the data, the interface re-enters state C; otherwise, it re-enters state A and awaits another start condition. Generally, the master controls the amount of data received by communicating a not-acknowledged (NAK) signal to the slave when the last desired data element is received, thereby returning the slave to the idle state, A.

In state E, the location at which the received data is to be stored is cleared, and the interface transitions to state F, wherein it receives the data from the master. After receiving each data item, the interface sends an acknowledge signal, and transitions back to state E to receive the next data item. If the slave device is unable to receive the data from the master, it asserts a non-acknowledged signal to the master, thereby terminating the current data-transfer session, and transitions back to the idle state A. If the master asserts another START condition, the interface returns to state B; otherwise, if the master asserts a STOP condition, the interface returns to the idle state A, to await the next START condition.

The prior art state diagram 200 implements the I²C-bus specification, and therefore can provide a standard interface for an I²C device by providing a state machine that embodies the state diagram 200. The functional element of the I²C device, such as a processor, a memory element, a display device, etc., need only provide the data that is to be transmitted, at state C, to the state machine, or provide a memory space for receiving the data that is to be received, at state E, to the state machine. In this manner, the designer of a functional element of the I²C device need not be concerned with the details of implementing an interface to the I²C-bus. For ease of reference, the term state machine 200 is used hereinafter to refer to a state machine that embodies the state diagram 200.

Although the prior art state machine 200 implements the I²C-bus specification, it has a number of limitations. As noted above, the I²C specification requires that the master device control the timing on the I²C-bus. A well-behaved master in an ideal environment will effectively control the state machine 200 in a slave device to effect the I²C-bus interface, but a poorly-behaved master, or a non-ideal environment, has the potential of locking-up or otherwise adversely affecting the operation of the prior art state machine 200, and potentially affecting the operation of the entire I²C-bus. For example, if a master ceases to toggle the SCL line, due to a problem in the master, or an unintentional disconnect, while the state machine 200 is in state D, the transmit-data state, the state machine 200 will remain in state D. When another master initiates a new transfer session, via the assertion of a START condition, and then toggles the SCL line, the state machine 200 will merely continue where it left off in state D, and will transmit its next bit while the other master is transmitting the address of the intended slave of its transfer session. Thereafter, the state of the I²C-bus, the state of the state machine 200, and the state of the other master will be indeterminate. The other master will likely recognize the interference and "back-off", but when it, or yet another master, attempts to communicate after asserting another START signal, the problem will recur. The problem continues until the state machine 200 transmits all of the data bits of its current data byte, then detects a high state on the SDA line at the next active SCL period, and returns to the idle state A. If the state machine detects a low value on the SDA line at the next active SCL period following the transmission of its last data bit, it will interpret this as an acknowledge-signal, will re-enter state C, load the next byte, and continue to transmit each of the bits of this new byte at each SCL transition. Other scenarios of potential problems can be formulated for other occurrences of anomalies on the SCL line while the state machine 200 is in other states, as well.

BRIEF SUMMARY OF THE INVENTION

It is an object of this invention to provide an apparatus and method for robustly controlling an interface to an I²C-bus. It is a further object of this invention to provide an apparatus and method for avoiding inappropriate and/or interfering transmissions on an I²C bus. It is a further object of this invention to provide a recovery mechanism for a slave device on an I²C bus after anomalous master-device behavior.

These objects and others are achieved by providing a robust state machine that controls an I²C-bus interface. The state machine is configured to enforce the slave-device-protocol of the I²C specification, and to provide recovery from anomalous master-device behavior. In accordance with this invention, the state transitions of the state machine at the slave-device are controlled by the master-device's control of the SCL line of the I²C-bus, except if a START condition is detected. The state machine is configured to asynchronously respond to a START condition on the I²C-bus, regardless of its current state, to force the state machine to a known state. In the known state following the START condition, the slave-device terminates any transmissions to the I²C-bus, thereby minimizing subsequent interference on the bus.

BRIEF DESCRIPTION OF THE DRAWINGS

The invention is explained in further detail, and by way of example, with reference to the accompanying drawings wherein.

Throughout the drawings, the same reference numerals and state identifiers indicate similar or corresponding features or functions.

DETAILED DESCRIPTION OF THE INVENTION

Figure 1:
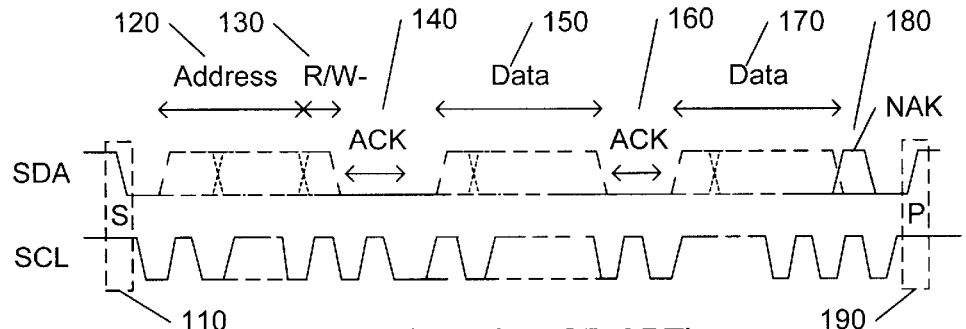
FIG. 1 illustrates an example timing diagram of a data transfer via an I²C-bus, as is common in the art.
Figure 2:
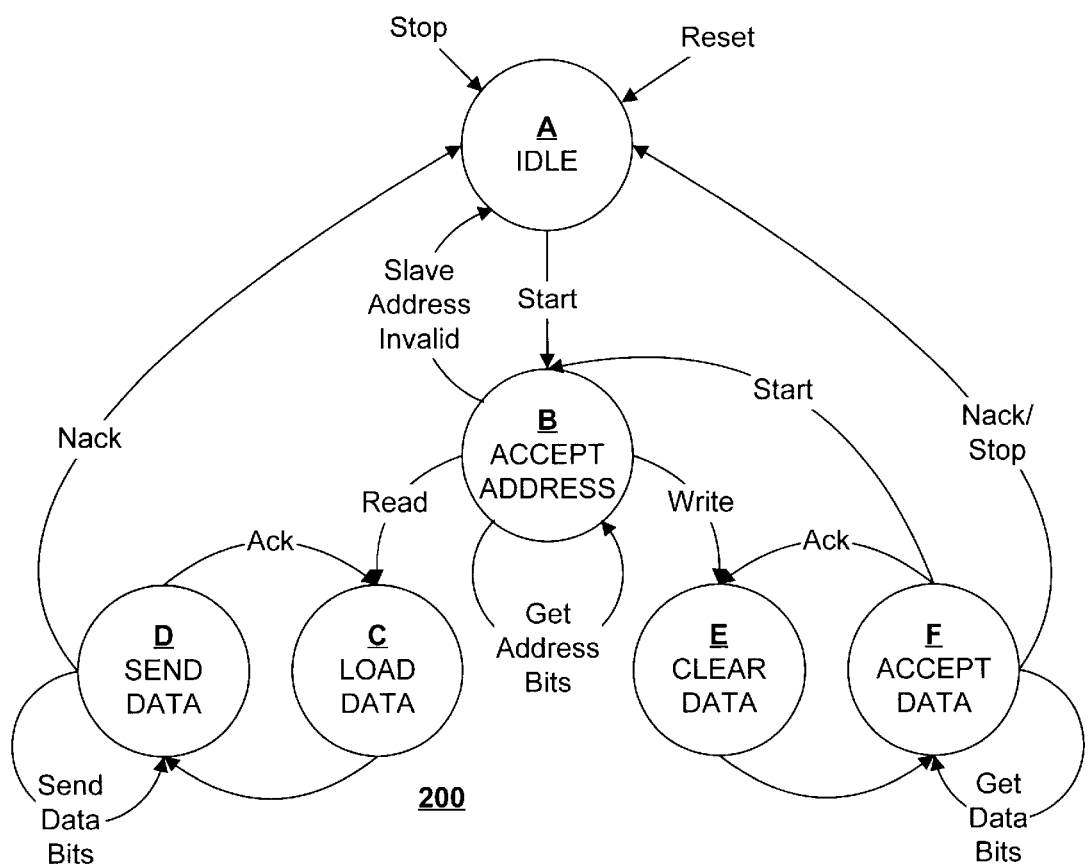
FIG. 2 illustrates an example state diagram of a prior art state machine that facilitates data transfer via an I²C bus.
Figure 3:
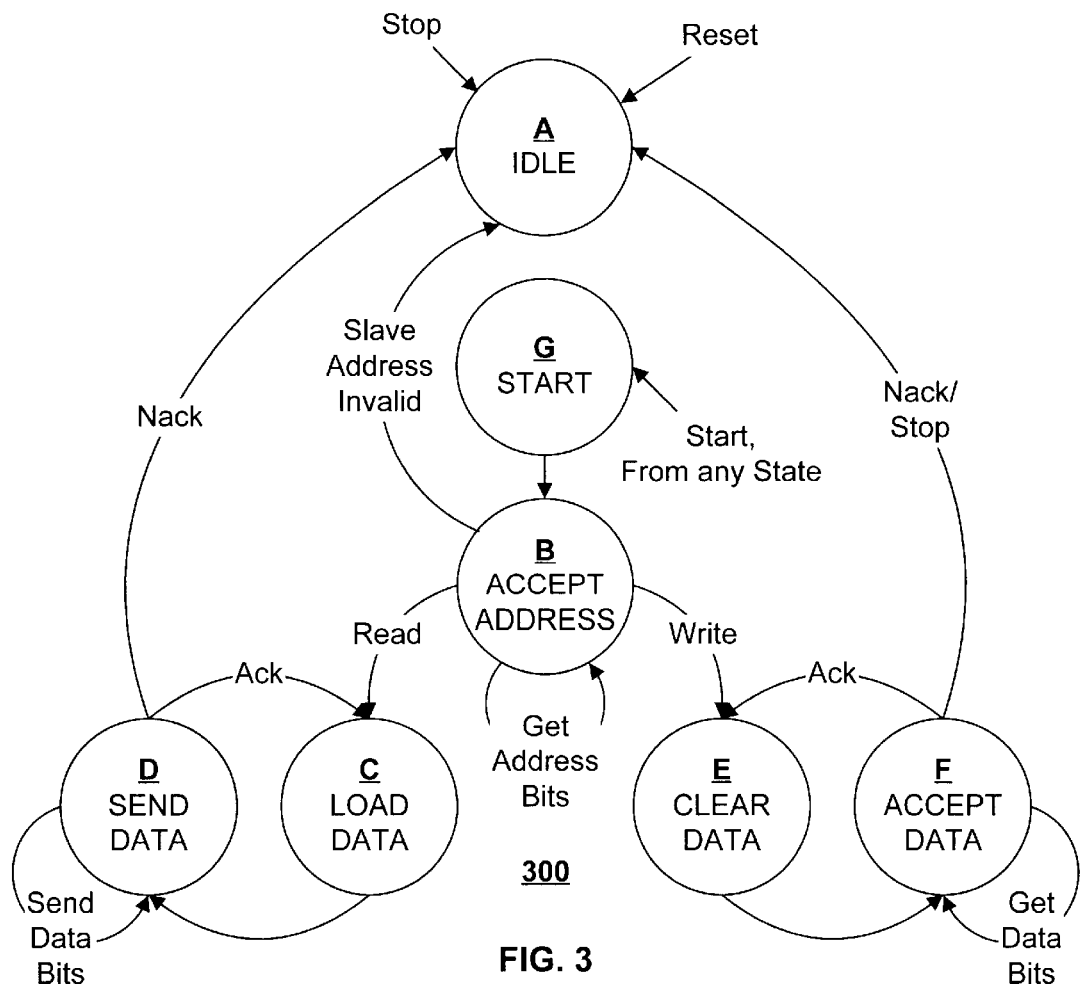
FIG. 3 illustrates an example state diagram of a state machine that facilitates data transfer via an I²C bus in accordance with this invention.

FIG. 3 illustrates an example state diagram of a state machine 300 that facilitates data transfer via an I²C bus in accordance with this invention. This state machine 300 includes similar states A–F to the state machine 200 of FIG. 2, and also includes a distinct start state G. State transitions are controlled by the SCL clock signal from a master device, except as noted below.

In accordance with this invention, the start state G is distinctly different from the idle state A, and distinctly different from the address state B of the prior art state machine 200. The start state G is entered, asynchronously, from any other state, whenever a START condition is detected on the I²C-bus. That is, although the state machine 300 is controlled by the clocking of the SCL line, the occurrence of a START condition overrides this control.

In the normal operation of the I²C-bus, the START condition only occurs while the state machine is in the idle state A. However, by providing for the possibility of anomalous behavior by the master-device, noise-induced transitions on the I²C bus, and other anomalies, and allowing for the abnormal occurrence of a START condition while the state machine 300 is in a different state than idle state A, the state machine 300 provides for rapid recovery from the effects of such anomalies. Further, by causing this transition to the start state G to be asynchronous, the recovery of the state machine 300 to a known state is effected independent of the master-device's clocking signal on the SCL line.

As is common in the art, a state machine includes a storage element, typically a D-flip-flop, for each bit of the encoding of the current state. An asynchronous setting of the storage elements to a known state is effected, for example, by connecting a signal corresponding to the detection of the START condition to the appropriate asynchronous SET or RESET inputs of each storage element. The detection of the START condition, the occurrence of a high-to-low transition on the SDA line while the SCL line is high, can be provided by a negative-edge triggered flip-flop having the SDA line as the clocking input, and the SCL line as the data input. In normal and proper non-START I²C operations, transitions of the SDA line occur only while the SCL line is low, and this START condition detector will continually provide a low output.

Table 1 illustrates the operation of the state machine 300 in accordance with this invention. As illustrated, each of the states A–F includes a Start* input condition that produces a next state of G, the start state. The asterisk indicates that this input condition provides an immediate, asynchronous, transfer to the next state, independent of the clock signal that controls the state machine state transfers.

In a preferred embodiment of this invention, the encoded values associated with the states A–G are encoded using a Gray-code, such that, except during the asynchronous transfer to state G, each state transition includes a change of only one bit in the state value. For example, state B is encoded as 0100. Valid transitions from state B include transitions to states A, C, or E. State A is encoded as 0000, which differs from state B by the value of the second most significant bit (MSB, reading left-to-right); state C is encoded as 1100, which differs from state B by the value of the first MSB; and state E is encoded as 0110, which differs from state B by the value of the third MSB. By limiting the simultaneous number of changing bit values, intermediate transition state values are not produced, thereby avoiding erroneous state changes. For example, if State C had been encoded as 1110, which differs from state B (0100) by the first and third MSBs, a transition from B 0100 to 1110 could provide a transient state value of 1100 if the first MSB transition occurs before the third MSB transition, or a transient state value of 0110 if the first MSB transition occurs after the third MSB transition. A set of seven four-bit values that provides this Gray-code encoding is illustrated in Table 1. As is known in the art, simple inversions and permutations of the given encoded values are equivalent Gray-codes.

TABLE 1

| State | Value | Title | Input | Next State | Action |
|-------|-------|-------|-------|------------|--------|
| A | 0000 | Idle | Start* | G | |
| B | 0100 | Accept Address | <8 bits | B | |
| | | | Valid & Read | C | Send ACK |
| | | | Valid & Write | E | Send ACK |
| | | | Address Invalid | A | |
| | | | Stop*/Reset* | A | |
| | | | Start* | G | |
| C | 1100 | Load Data | (null) | D | Load Data from Memory |
| | | | Stop*/Reset* | A | |
| | | | Start* | G | |
| D | 1000 | Send Data | <8 bits | D | Send Data bit |
| | | | ACK from Master | C | |
| | | | NAK from Master | A | |
| | | | Stop*/Reset* | A | |
| | | | Start* | G | |
| E | 0110 | Clear Data | (null) | F | Clear Memory for Data |
| | | | Stop*/Reset* | A | |
| | | | Start* | G | |
| F | 0010 | Accept Data | <8 bits | F | Store Data in Memory |
| | | | =8 bits | E | Send ACK |
| | | | Receive Error | A | Send NAK |
| | | | Stop*/Reset* | A | |
| | | | Start* | G | |
| G | 0101 | Start | (null) | B | |
| | | | Stop*/Reset* | A | |

Figure 4:
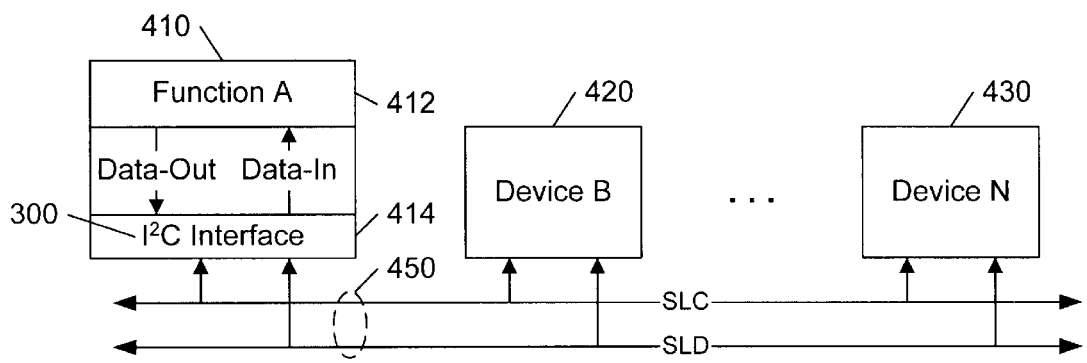
FIG. 4 illustrates an example configuration of I²C devices that include a state machine that facilitates data transfer via an I²C bus in accordance with this invention.

FIG. 4 illustrates an example configuration of I²C devices 410–430 on an I²C-bus, wherein at least one of the devices 410 includes an I²C-bus interface 414 that include a state machine 300 in accordance with this invention. The I²C devices 410–430 include a functional element, such as a processor, memory element, display device, and so on, that provides and/or receives data to and from the I²C-bus 450. In accordance with this invention, an I²C interface 414 allows a functional element 412 to transfer data to and from the I²C-bus 450 by merely providing the data-out bytes that are to be transmitted to the I²C-bus 450, and/or providing memory for receiving data-in bytes from the bus 450. The interface 414 provides the embodiment of a communications scheme that conforms to the I²C specification, and specifically includes a slave-device interface that is controlled by a state machine 300, as presented above. Note that, by providing a verified interface to the I²C-bus, the designers of the functional elements 412 of I²C devices 410–430 need only provide the data-out bytes and memory for the data-in bytes, and are free of the details of the I²C communications protocol.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A device comprising:
   a function element that is configured to provide or accept data to and from an I²C bus, and
   an interface, operably coupled to the function element and the I²C bus, that is configured to facilitate communication of data between the function element and the I²C bus;
   the interface comprising a state machine that is configured to control the interface that includes:
a plurality of states including: an idle state, an address state, a load-data state, a send-data state, a clear-data state, an accept-data state, and a start state;

wherein, the state machine is configured to:
asynchronously enter the start state upon detection of a start signal on the I²C bus,
asynchronously enter the idle state upon detection of a reset signal on the I²C bus, and
upon receipt of each of a plurality of clock signals on the I²C bus:
enter the address state if the state machine is in the start state,
enter the load-data state if the state machine is in the address state and a read command is received from the I²C bus,
enter the send-data state if the state machine is in the load-data state,
enter the clear-data state if the state machine is in the address state and a write command is received from the I²C bus, and
enter the accept-data state if the state machine is in the clear-data state.

2. The device of claim 1, wherein the state machine is further configured to:
assert an acknowledge signal whenever the state machine enters the load-data state or the clear-data state from the address state.

3. The device of claim 1, wherein the state machine is further configured to:
enter the idle state if the state machine is in the send-data state and an acknowledge signal is not received on the I²C bus, and
enter the idle state if the state machine is in the accept-data state and data transfer on the I²C bus is complete.

4. The device of claim 3, wherein the state machine is further configured to:
assert a non-acknowledge signal whenever the state machine enters the idle state from the accept-data state.

5. The device of claim 1, wherein the state machine is further configured to:
enter the idle state if the state machine is in the address state and a received address does not correspond to an address associated with the device.

6. The device of claim 1, wherein the state machine is further configured to:
enter the load-data state if the state machine is in the send-data state and a transmitted data item is acknowledged, and,
enter the clear-data state if the state machine is in the accept-data state and a data item is received.

7. The device of claim 1, wherein the plurality of function states are encoded as a set of bits, such that each state change upon receipt of the clock signal includes a change of a single bit of the set of bits.

8. The device of claim 1, wherein the plurality of function states are encoded as a set of bits, each bit having a first state, a, and a second state, b, such that:
the idle state is encoded as aaaa,
the address state is encoded as abaa,
the load-data state is encoded as bbaa,
the send-data state is encoded as baaa,
the clear-data state is encoded as abba,
the accept-data state is encoded as aaba, and
the start state is encoded as abab.

9. The device of claim 1, wherein the state machine is further configured to asynchronously enter the idle state upon detection of a stop signal on the I²C bus.

10. An interface device that is configured to facilitate communication via an I²C bus, comprising
a state machine that is configured to control the interface device that includes:
a plurality of states including: an idle state, an address state, a load-data state, a send-data state, a clear-data state, an accept-data state, and a start state;

wherein, the state machine is configured to:
asynchronously enter the start state upon detection of a start signal on the I²C bus,
asynchronously enter the idle state upon detection of a reset signal on the I²C bus, and
upon receipt of each of a plurality of clock signals on the I²C bus:
enter the address state if the state machine is in the start state,
enter the load-data state if the state machine is in the address state and a read command is received from the bus,
enter the send-data state if the state machine is in the load-data state,
enter the clear-data state if the state machine is in the address state and a write command is received from the I²C bus, and
enter the accept-data state from the clear-data state.

11. The interface device of claim 10, wherein the state machine is further configured to:
assert an acknowledge signal whenever the state machine enters the load-data state or the clear-data state from the address state, and
assert a no-acknowledge signal whenever the state machine enters the idle state from the accept-data state.

12. The interface device of claim 10, wherein the state machine is further configured to:
enter the idle state if the state machine is in the send-data state and an acknowledge signal is not received on the I²C bus,
enter the idle state if the state machine is in the accept-data state and data transfer on the I²C bus is complete,
enter the idle state if the state machine is in the address state when a received address is invalid,
enter the load-data state if the state machine is in the send-data state and a transmitted data item is acknowledged, and,
enter the clear-data state if the state machine is in the accept-data state and a data item is received.

13. The interface device of claim 10, wherein the plurality of function states are encoded as a set of bits, such that each state change upon receipt of the clock signal includes a change of a single bit of the set of bits.

14. The interface device of claim 10, wherein the plurality of function states are encoded as a set of bits, each bit having a first state, a, and a second state, b, such that:
the idle state is encoded as aaaa,
the address state is encoded as abaa,
the load-data state is encoded as bbaa,
the send-data state is encoded as baaa, the clear-data state is encoded as abba, the accept-data state is encoded as aaba, and the start state is encoded as abab.

15. The interface device of claim 10, wherein the state machine is further configured to asynchronously enter the idle state upon detection of a stop signal on the I²C bus.

16. A method for facilitating communication on an I²C bus via a state machine, comprising:

asynchronously entering a start state upon detection of a start signal on the I²C bus, asynchronously entering an idle state upon detection of a reset signal on the I²C bus, and upon receipt of each of a plurality of clock signals on the I²C bus:

entering an address state if the state machine is in the start state, entering a load-data state if the state machine is in the address state and a read command is received from the I²C bus, entering a send-data state if the state machine is in the load-data state, entering a clear-data state if the state machine is in the address state and a write command is received from the bus, and entering an accept-data state if the state machine is in the clear-data state.

17. The method of claim 16, wherein entering the load-data state or the clear-data state if the state machine is in the address state includes asserting an acknowledge signal, and entering the idle state if the state machine is in the accept-data state includes asserting a no-acknowledge signal.

18. The method of claim 16, further including:

entering the idle state if the state machine is in the send-data state and an acknowledge signal is not received on the I²C bus, entering the idle state if the state machine is in the accept-data state and data transfer on the I²C bus is complete, entering the idle state if the state machine is in the address state and a received address does not correspond to an address associated with the state machine, entering the load-data state if the state machine is in the send-data state and a transmitted data item is acknowledged, and, entering the clear-data state if the state machine is in the accept-data state and a data item is received.

19. The method of claim 16, further including asynchronously entering the idle state upon detection of a stop signal on the I²C bus.

\* \* \* \* \*